United States Patent
Shen et al.

(10) Patent No.: US 12,317,074 B2
(45) Date of Patent: May 27, 2025

(54) VALIDATING AUTHENTICITY OF AN APPLICATION ACCESSING A NETWORK SLICE

(71) Applicant: Hewlett Packard Enterprise Development LP, Spring, TX (US)

(72) Inventors: Wei Shen, Plano, TX (US); Mu-Jin Liu, Shanghai (CN)

( * ) Notice: Subject to any disclaimer, the term of this patent is extended or adjusted under 35 U.S.C. 154(b) by 406 days.

(21) Appl. No.: 18/050,586

(22) Filed: Oct. 28, 2022

(65) Prior Publication Data
US 2024/0147231 A1   May 2, 2024

(51) Int. Cl.
*H04W 12/06* (2021.01)
*H04W 48/18* (2009.01)

(52) U.S. Cl.
CPC .......... *H04W 12/06* (2013.01); *H04W 48/18* (2013.01)

(58) Field of Classification Search
CPC ... H04W 12/06; H04W 48/18; H04W 12/068; H04W 12/10; H04L 41/40
See application file for complete search history.

(56) References Cited

U.S. PATENT DOCUMENTS

| | | | |
|---|---|---|---|
| 2018/0007552 A1 | 1/2018 | Bae et al. | |
| 2021/0306939 A1* | 9/2021 | Zhang | H04W 76/15 |
| 2022/0369199 A1* | 11/2022 | Huang | H04W 40/02 |
| 2023/0185983 A1* | 6/2023 | Ramanasankaran | G06F 30/27 |
| | | | 703/1 |

OTHER PUBLICATIONS

3GPP TS 24.526, "3rd Generation Partnership Project; Technical Specification Group Core Network and Terminals; User Equipment (UE) policies for 5G System (5GS); Stage 3 (Release 16)", Sep. 2020, 52 pages.
Android Developers, "Add 5G capabilities to your app", available online at <https://developer.android.com/about/versions/11/features/5g#meteredness>, 2022, 6 pages.
Android Open Source Project, "5G Network Slicing", available online at https://source.android.com/docs/core/connect/5g-slicing>, 2022, 14 pages.
Android Open Source Project, "Application Signing", available online at <https://source.android.com/docs/security/features/apksigning>, 2022, 4 pages.

(Continued)

*Primary Examiner* — Brandon J Miller
(74) *Attorney, Agent, or Firm* — Brooks Kushman P.C.

(57) ABSTRACT

Examples described herein relate to techniques for routing application data through a selected network slice based on validation of an application entitlement request. In some examples, an entitlement system may receive an application entitlement request corresponding to an application that is on a user equipment. The entitlement system may validate the authenticity of the application based on the application authenticity information from the entitlement request. The entitlement device may in response to validation of the application entitlement request, send an application entitlement response to the user equipment such that the user equipment selects a network slice to route application data corresponding to the application.

20 Claims, 5 Drawing Sheets

(56) References Cited

OTHER PUBLICATIONS

Ericsson, "FarEasTone and Ericsson mark a breakthrough in 5G network slicing", available online at <https://www.ericsson.com/en/press-releases/2/2021/11/20211102-fareastone-and-ericsson-mark-a-breakthrough-in-5g-network-slicing>, Nov. 1, 2021, 5 pages.
GSM Association, "Service Entitlement Configuration Version 8.0", Jan. 28, 2022, 122 pages.
GTI, "5G Smart Devices Supporting Network Slicing White Paper", NGMN Alliance, -Dec. 15, 2020, 40 Pages.
Nick Wood, "Google carves out a role in 5G slicing", Telecom TV, available online at <https://www.telecomtv.com/content/5g/google-carves-out-a-role-in-5g-slicing-42835/>, Nov. 3, 2021, 3 pages.

* cited by examiner

VALIDATING AUTHENTICITY OF AN APPLICATION ACCESSING A NETWORK SLICE

BACKGROUND

Communication systems have been developed to meet rising data traffic demands and diversified services. Fifth generation (5G) communication systems are one such example. 5G communication systems can be implemented in higher frequency bands, e.g., 60 GHz bands, so as to accomplish higher data rates when compared to 4G Long Term Evolution (LTE) which may operate under 6 GHz bands. Moreover, 5G communication systems can support varied use cases by offering optimized network services to users. Technologies such as Network Function Virtualization (NFV) and network slicing technology utilizing NFV enable 5G communication systems to offer such optimized network services. Generally, network slicing may define multiple logical networks (or slices) on top of physical infrastructure resources. Resources can be dedicated exclusively to a single network slice or shared among different network slices. Resources may include compute, storage, access, transport, Virtualized Network Functions (VNFs), and so forth. Network slicing may include instantiation, configuration, and/or activation of target network slice instances. A set of Network Functions may be selected and instantiated, configured, and/or activated for a given network slice.

BRIEF DESCRIPTION OF THE DRAWINGS

The present disclosure, in accordance with one or more various examples, is described in detail with reference to the following figures. The figures are provided for purposes of illustration only and merely depict examples, wherein.

Figure 1:
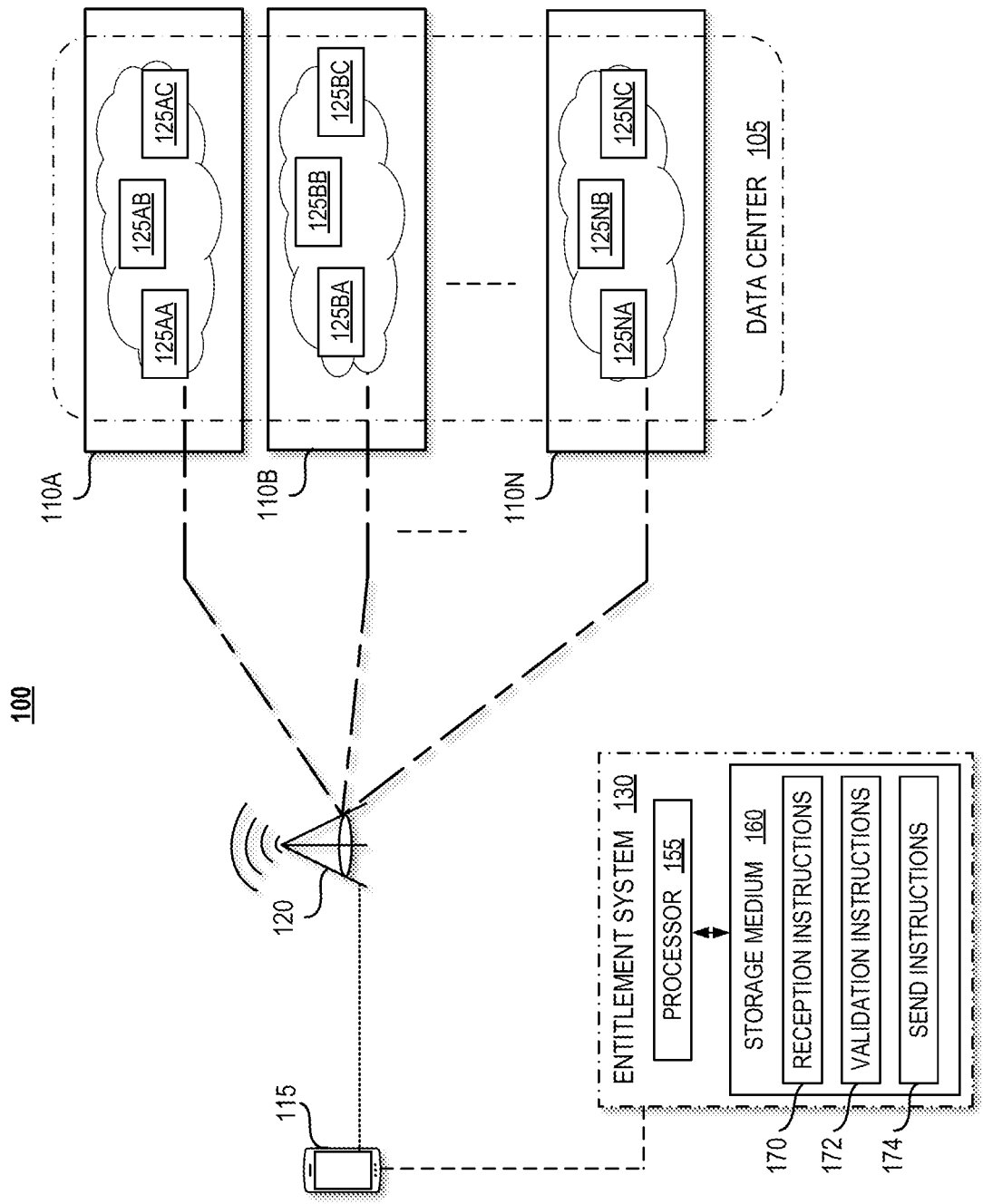
FIG. 1 illustrates a schematic view of a network architecture in which various examples of the present disclosure may be implemented.

The figures are not exhaustive and do not limit the present disclosure to the precise form disclosed.

DETAILED DESCRIPTION

Evolving communication systems, such as 5G mobile networks, are expected to deliver improved transmission capacity with reduced packet transmission delays. With network slicing, Communication Services Providers (CSPs) can create and launch custom services with varying network requirements for a wide variety of applications and services, such as the Internet of Things (IoT), Augmented Reality (AR), autonomous vehicle technologies, etc. CSPs may rely on virtualization technologies, such as Network Function Virtualization (NFV) for network slicing. As used herein, NFV enables virtualized network services, such as routing, security, load balancing, and so forth that have traditionally been run on dedicated hardware. NFV may be implemented by separating NF instances of a network slice from the physical resources that it is deployed on, allowing CSPs to manage and expand their network capabilities on demand. Further, such implementation may be optimized for deployment on distributed resources, such as cloud infrastructure. Cloud infrastructure resources can be dynamically provisioned for optimal resource utilization, energy consumption, etc. Thus, 5G services, which are cloud-native, can support a range of applications with continually updated capabilities. Further, CSPs may use automation-driven services, such as Continuous Integration (CI) and/or Continuous Delivery (CD).

Communication systems, such as 5G, are expected to deliver improved transmission capacity with reduced packet transit delays. With network slicing, one or more network services can be created with customized service characteristics for enhanced application security, reliability, and performance. Communication Services Providers (CSPs) can create and launch custom services with variable network requirements for a wide variety of applications. These applications may include, but are not limited to the Internet of Things (IoT), Augmented Reality (AR), autonomous vehicles technologies, enterprise access, etc.

Further, some of the Operating Systems (OSs) may enable service providers to deliver enterprise applications and/or services over network slices. For example, a network channel can be dedicated to a financial application with higher bandwidth, lower latency, higher reliability, and increased security and isolation. This enables financial institutions to deliver critical and sensitive data to employees' or customers' devices. Whereas, an enterprise may use a different network slice with high security for employees working remotely. A user's equipment can switch to a specific network slice based on specific application traffic to be routed. In some examples, UEs may use a work profile to use with enterprise applications and may use a personal profile to use applications outside work. To this end, the user equipment may use a User Equipment (UE) Route Selection Policy (URSP) to direct application traffic through a specific network slice.

A URSP/URSP rule may be used to manage network slice information for a user equipment. A network slice selection policy can be configured dynamically through URSP. The third Generation Partnership Project (3GPP) specifies how the URSP rule can be provisioned from the network to user equipment during the initial registration of the UE with the network. Based on URSP, a UE can use a target network slice for routing application traffic. URSP may include information, such as precedence, Traffic Descriptor (TD), and Route Selection Descriptors (RSD). The TD information can be used for application and network slice mapping. In some examples, an application identifier may be used as a TD. Single-Network Slice Selection Assistance Information (S-NSSAI) may be used as RSD. The S-NSSAI may represent network resources of access, core, and/or transport networks used for a slice. A subscriber database of a network may include S-NSSAI/s related information based on user subscription. Further, for every newly detected application, the user equipment may use the URSP rules to ascertain if an application matching TD is available to find the corresponding RSD.

At the network end, a Policy Control Function (PCF) of a 5G Core (5GC) may determine appropriate URSP rule/s for an application based on criteria, e.g., device information, subscription and subscription policy related information, time window, device location, or a combination thereof. In some examples, the PCF may communicate the URSP rule to a UE through an Access and Mobility Management Function (AMF). Further, URSP rules may enable a user equipment to simultaneously operate multiple applications with different network slices. However, with some of the existing processes and standards, network slicing services may be misappropriated and falsely used by malicious parties. For example, certain rouge applications may mimic a TD (e.g., application identifier) thereby gaining unauthorized access to network slice/s. This may overwhelm the network with additional traffic and cause an economic burden on a service provider and/or the CSP.

To mitigate such misappropriation, work profiles may be used in some enterprise application-related use cases. Work profiles enable authentication and access control thereby ensuring that traffic from enterprise applications is routed through a given enterprise network slice. In an enterprise-employee relationship use case example, the user equipment may be provided or managed by the enterprise. When using a personal device, limited access may be provided to the user. Any unauthorized users or rouge applications may not get access to the enterprise network slice. To manage these access controls, enterprises may maintain a management system, such as Enterprise Mobility Management (EMM) system to manage UEs for using work profiles. Enterprises may have to invest in and maintain these management systems. However, this may burden certain enterprises, especially Small and Medium Businesses (SMBs). Whereas, in the case of certain consumer applications (e.g., a Virtual Reality (VR) gaming application), a user may use their personal devices. A management system may not be in a position to manage such personal devices of users.

Accordingly, techniques of the present disclosure are directed to authenticating an application of user equipment to securely route network traffic through a selected network slice. In particular, techniques discussed herein enable the authentication of an application without using an Enterprise Mobility Management (EMM) system. According to some examples, an entitlement system authenticates an application's access to a network slice. The entitlement system may verify the authenticity of an application to validate its eligibility to connect to a network slice. For the purposes of verification of application entitlement, the entitlement system may store reference authenticity information, such as an application signature, application identifier, etc. Upon receiving an entitlement request, the entitlement system may compare application authenticity information, which is part of the entitlement request, with reference authenticity information to validate the application's access. According to some examples, when an application entitlement request fails validation, a requesting application may be allowed to route application traffic through a default network slice.

According to some examples of the present disclosure, an entitlement system may receive an application entitlement request corresponding to an application on the user equipment. The entitlement system may receive an application entitlement request when an application is installed or when an application is opened to be run on the user equipment. The application entitlement request may include application authenticity information, such as an application signature, application identifier, operating system information, and hardware information of the user equipment. The entitlement system may validate the application entitlement request received from the user equipment. According to some examples, the entitlement system may compare the application authenticity information with reference authenticity information stored in a database. In some other examples, a cryptographic or hash function may be used for verification of the application authenticity information. In response to the validation of the application entitlement request, the entitlement system may send an application entitlement response to the user equipment. In an example, when an application is installed but not run, a user equipment may perform an application entitlement process, as discussed herein, and store the application entitlement response. The user equipment can route application data corresponding to the given application through a selected network slice.

In some examples of the present disclosure, for the purpose of validation of the entitlement request, the entitlement system receives reference authenticity information from the application owner or enterprise owner. The reference authenticity information may be stored locally and/or remotely in a database. In some further examples, the entitlement system can be a Device Entitlement Gateway, or an Entitlement system configured to perform techniques discussed herein. The entitlement system performs application authentication that may restrict access to rouge applications.

In some examples, the entitlement system receives an application entitlement request from the user equipment, which is in response to an application being launched on the user equipment. In some examples, the user equipment may invoke a service Application Programming Interface (API) to initiate an application entitlement request. In one example, the service API is a Technical Specification (TS) .43 service API. Per some examples, an application on the UE may invoke the service API to initiate an application entitlement request, send an HTTP request, and to invoke a telephony API. In some examples, the application entitlement request may include a user-based authentication request. In one example, the authentication request can be an Extensible Authentication Protocol (EAP)-Authentication and Key Agreement (AKA) based authentication. Based on the condition that the user authentication is successful, the entitlement system validates the application. An application is considered to be validated when the application authenticity information matches the reference authenticity information stored in the database. This validation may confirm that the application is authentic and is eligible to access a target network slice.

In some examples, with additional authentication, such as EAP-AKA, the entitlement system may limit application access to certain network slices when a user fails this authentication step. For example, an employee working in a non-financial domain may not have access to certain network slices optimized for financial services.

Further, the entitlement system may send an entitlement response with application validation/invalidation information. In response to the reception of a valid application response, the user equipment can select a target network slice defined in a User Equipment (UE) Route Selection Policy (URSP) Rule. In some examples, communication between the user equipment and the entitlement system is encrypted to avoid unauthorized devices to gain access to entitlement information. In one example, the encryption can be Transport Layer Security (TLS) encryption. In some examples, the user equipment may independently receive a URSP rule for the application.

In some examples, user equipment, before communicating an application entitlement request to the entitlement system, may perform one or more of the following actions.

The user equipment may perform an initial registration with a 5G network. During the initial registration, the user equipment may update its location, and provide its identity (e.g., International Mobile Equipment Identity (IMEI)), etc. to the 5GC of the 5G network. A PCF of the 5GC may retrieve subscription information from a Unified Data Repository (UDR). Based on the subscription information and other variables, the PCF may select an applicable device policy, such as a URSP rule. The PCF communicates the device policy to the AMF. Further, the AMF communicates the device policy to the user equipment. In some examples, the user equipment may include a mode/trans-receiver to communicate with the network.

FIG. 1 illustrates a schematic view of a network architecture 100 in which various examples of the present disclosure may be implemented. The network architecture 100 illustrates selected, non-limiting components corresponding to a communication system. In one example, the communication system is a 5G communication system. In some other examples, the communication system can be related to a Sixth Generation (6G) or later generation communication system.

In some examples, the network architecture 100 can be scalable with an agile infrastructure, which may be based on various architectural concepts. In one example, the architectural concepts may include one or more of Network Function Virtualization (NFV), container orchestration, Software Defined Networking (SDN), network slicing, etc. In some further examples, the aforementioned agile infrastructure may be distributed with infrastructure resources spread across from the Edge to the cloud. As used herein, the Edge may refer to a computing and/or data storage location that may be in proximity to a data source in a distributed computing architecture. Further, in an example, a communication system may include network functions, applications, and/or services that can be deployed as workloads on distributed infrastructure resources. As used herein, an infrastructure resource may be composed of physical and/or virtual resources that support storage, processing, networking, communication, etc.

In some examples, the network architecture 100 may be distributed with resources, such as servers, spread across a plurality of data centers. The illustrative example of FIG. 1 shows a single data center 105. In some other examples, the network architecture 100 may include an Edge data center, a regional data center, and a central data center. As used herein, an Edge data center may refer to a data center that is located closer to a data source when compared to a traditional data center. A central data center may be located farther from the data source when compared to an Edge data center. A regional data center may be geographically and/or logically disposed between an Edge data center and a central data center. In some further examples, the number of data centers is not limited to examples discussed herein and may include any number of data centers. Each data center may include physical or virtual resources to instantiate network functions corresponding to various network slices.

Further, a communication system may include multiple network slices that can be supported by the network architecture 100. Each network slice may be optimized to serve a specific use case, based on customer demand and/or segmentation. Each network slice may utilize a portion of the infrastructure resources. In the ongoing example, the network architecture 100 includes a plurality of network slices 110A, 110B, ..., 110N. Each of these network slices 110A-110N may be realized using infrastructure resources deployed at the data center 105. Further, each network slice may be composed of one or more network function/s. For example, the network slice 110A is composed of network functions 125AA-125AC. Similarly, the network slices 110B and 100N may be composed of network functions 125BA-125BC and 125NA-125NC, respectively. Accordingly, the composition of one network slice may vary from another network slice.

According to some examples, the network slices 110 may use NFV to instantiate various network functionalities onto virtual resources, as opposed to traditionally used fixed resources. NFV can be used to manage infrastructure resources required during the life cycle of a network slice. Further, SDN may also be used to enable the provisioning of virtual resources located at the Edge, the regional, or the central data centers 105.

The network architecture 100 may facilitate communication for various categories of User Equipment (UE) 115. That is, each network slice may be customized to cater to a specific category of UE or a specific category of application. Category of a UE may correspond to but is not limited to a mobile device, a computing device, a low-power device (e.g., Internet of Things (IoT) device), sensing equipment with communication capability, etc. Category of application may include but not limited to smart homes, security, logistics, shipping, industrial IoT, healthcare, autonomous mobility, etc. As used herein, a UE can be any communication device, such as a cellular phone, a portable computing device, an IoT device, a sensing/metering device, a smart television, a security device (e.g., security camera), a vehicle control system, a network device, a remotely piloted aerial vehicle (e.g., drone), or any other device with communication capability.

Further, the network architecture 100 may include a Radio Access Network (RAN) communicatively coupled to a core network. Customers (e.g., UE users) may connect to the core network via the RAN. In one example, the RAN may include a base station 120, which can be a trans-receiver. UE/s may establish one or more Packet Data Unit (PDU) sessions which get communicated via the base station. In a 5G communication system, a 5G Core Network (5GC) can be a core network and the base station can be a gNodeB (gNB).

The UE 115 can wirelessly connect to a RAN at the base station 120. The base station 120 can establish a connection with a data network via a core network. When UE runs an application, it may communicate with a data network. The UE may establish a communication session (e.g., a Packet Data Unit (PDU) session) with the data network. The UE and the core network can communicate application-specific data during the communication session. In some examples, in order to establish communication session/s, the UE sends an initial request to register with the core network. During the initial registration, a component of the 5GC may send to the UE one or more applicable URSP rule/s.

According to some examples, the core network may include multiple NFs configured to offer various data and/or telecommunication services. For example, 5GC may include various NFs, such as an Access and Mobility Management Function (AMF), an Authentication Server Function (AUSF), a Policy Control Function (PCF), an Session Management Function (SMF), a User Plane Function (UPF), a Network Exposure Function (NEF), a Network Function Repository Function (NRF), a Unified Data Management (UDM) function, and so forth. One or more of the aforementioned functions may operate as per the Third Generation Partnership Project (3GPP) standards for 5G (e.g., 3GPP Technical Specifications 29.502 and/or 29.518). One or more of these NFs may be instantiated to support PDU sessions of UE/s. In a further example, NFV may be used to virtualize one or more NFs, which can be in the form of executable instructions stored in one or more computer-readable storage mediums.

Further, the network architecture 100 may include an entitlement system 130. As used herein, an entitlement system is a system configured to receive an application entitlement request and validate user equipment and/or the UE thereby sending an entitlement response. Further, the entitlement system 130 is configured to securely authenticate and authorize user equipment/s and application/s. According to some examples, the entitlement system 130 may include a processor 155 and a storage medium 160. The entitlement system 130 may include a bus or other communication mechanisms (not shown) for communicating information (e.g., commands and/or data). The processor 155 can be a hardware processor, also referred to as a processing resource. The processor 155 is functionally coupled to the storage medium 160. In some examples, the storage medium 160 may be machine-readable and non-transitory type. Hence, the storage medium 160 is alternatively referred to as a non-transitory machine-readable storage medium. The storage medium 160 may be any electronic, magnetic, optical, or any other storage device that may store data and/or executable instructions. According to some examples, the storage medium 160 may store instructions 170, 172, and 174.

According to some examples, the processor 155 may execute reception instructions 170 that cause the processor 155 to receive an application entitlement request corresponding to an application, which is on a UE (e.g., the UE 115). In some examples, the UE 115 may communicate with the entitlement system 130 using an HTTP/S protocol. The application entitlement request may include application authenticity information, such as an application signature and application identifier. The application signature can be generated by an application developer/owner and is unique to each application. The application identifier can be used to uniquely identify each application.

Further, the processor 155 may execute validation instructions 172 that cause the processor to validate the authenticity of the application based on the application's authenticity information. The entitlement system may authorize any legitimate application entitlement request and is configured to identify any unauthorized/rogue applications. In some examples, for the purpose of validation, the application signature may be verified against a reference application signature available with the entitlement system 130.

The processor 155 may execute send instructions 174 that cause the processor to send an entitlement response to the UE, in response to the validation of the application entitlement request. According to some examples, validation of the application entitlement request may include verification of the application authenticity information received by the entitlement system. The outcome of the application entitlement request can be a success or a failure. A valid application authenticity information may result in a successful entitlement validation. Accordingly, the processor may execute instructions that cause the processor to send an entitlement response (e.g., entitlement success message) to the UE. When the entitlement response indicates that the application is valid, it indicates to the UE that the application is authentic and not an imposter. Further, the UE may match an application service flow with a target network slice based on a URSP that the UE may have received from the core network. In some examples, during an initial registration of the UE 115, the CSP may communicate URSP and/or Single-Network Slice Selection Assistance Information (S-NSSAI) to the UE.

In some examples, the entitlement system 130 may be associated with a CSP. In some examples, more than one entitlement system may be deployed with capabilities similar to that of the entitlement system 130, as discussed herein. Each entitlement system may be configured to securely validate an application entitlement request such that an application can avail a specific network slice.

In the examples described herein, a processing resource (e.g., processor 155) may fetch, decode, and execute instructions 170-174 stored in a machine-readable type of storage medium (e.g., the storage medium 160) to perform the secure authentication of an application entitlement, as described herein. Instructions 170-174, when executed by the processor 155, may at least partially implement some or all functions of entitlement system 130, as per the present disclosure.

The entitlement system 130 can be a physical device, a set of instructions, running on a virtual machine, or a combination of two or more deployed on a customer premise, at a data center, at Edge, or similar CSP premises. In some other examples, the entitlement system 130 is offered as-a-Service (aaS) to a CSP, an enterprise, or other service providers. Hereinafter, the entitlement system may be referred to as a 'system' for brevity.

Figure 2:
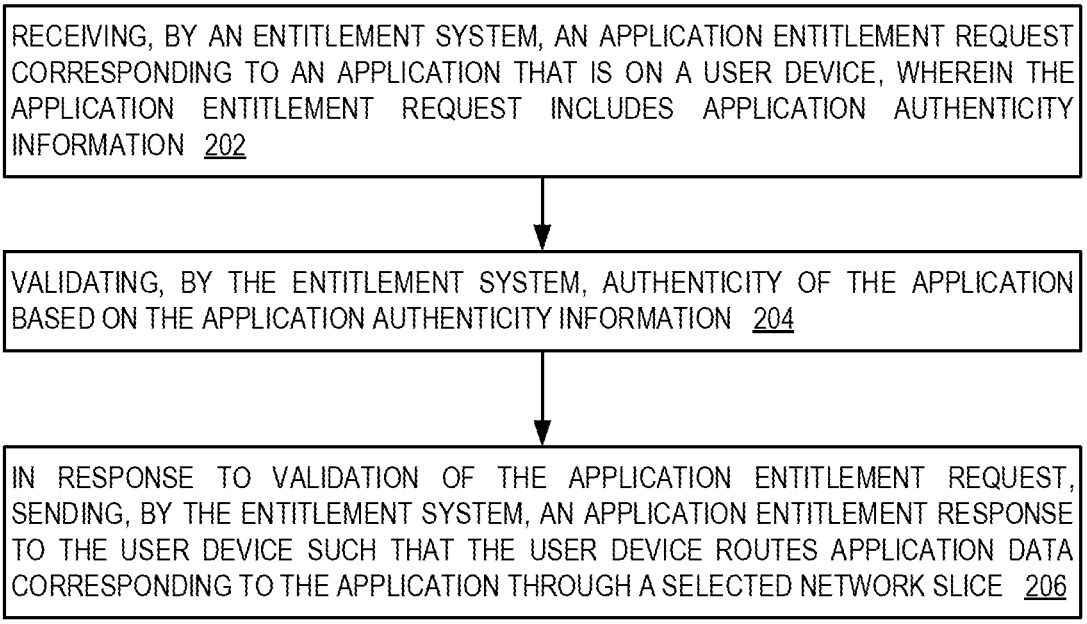
FIG. 2 illustrates a flow diagram depicting a method for authenticating an application entitlement request, per various examples of the present disclosure.

FIG. 2 illustrates a flow diagram depicting a method of securely authenticating an application entitlement request from a User Equipment (UE), per various examples of the present disclosure. Although the execution of method 200 is described below with reference to an entitlement system (e.g., entitlement system 130 of FIG. 1), other suitable components for the execution of method 200 may be utilized. Additionally, the components for executing method 200 may spread among multiple systems/devices. In some examples, method 200 may be implemented in the form of executable instructions stored on a machine-readable storage medium and/or in the form of electronic circuitry, e.g., hardware. In some further examples, blocks of method 200 may be executed substantially concurrently or in a different order than shown in FIG. 2. In yet some further examples, method 200 may include additional blocks than that are shown in FIG. 2 or skip certain blocks. In some additional examples, some of the blocks of method 200 may, at certain times, be ongoing and/or may repeat.

At block 202, the entitlement system 130 may receive an application entitlement request corresponding to an application, which is on a UE. The entitlement system 130 may receive the entitlement request, which is based on a trigger due to the opening of the application on the UE. In other examples, other triggers may include an initial user registration with an application, installing an application on the UE, or similar operations that may cause the UE to send an entitlement request. The application entitlement request may include application authenticity information. For example, the application authenticity information may include the application signature and application identifier.

The UE may include a service Application Programming Interface (API) that communicates with the entitlement system. In some examples, when the UE triggers the entitlement request, the user may not be aware of an entitlement process taking place. According to some examples, the UE may detect a newly installed application and the UE may assess the URSP rules to find a matching TD. Based on the matching TD, an RSD may be identified. In some examples, the TD may include an application descriptor. The application descriptor can be used for identifying an application that generates traffic from a specific application.

In some examples, the entitlement process may additionally include an authentication procedure, which can also be performed without the intervention of the user. The details of the authentication procedure are discussed in conjunction with FIG. 3.

At block 204, the entitlement system may validate the authenticity of the application based on the application authenticity information. In some particular examples, the entitlement system may check whether the application is a valid and authentic application to communicate data through a given network slice. During such validation, the entitlement system may identify any unauthorized/rogue applications thereby disabling access to such applications. In some examples, the application authenticity information may include an application signature.

In some examples, each application may have an associated application signature, which is generated by the owner of the application. The application signature is unique and difficult to be imitated/modified. The application signature acts as an authentic reference for the validation of the application.

At block 206, the entitlement system may send an entitlement response to the UE, in response to the validation of the application entitlement request. According to some examples, validation of the application entitlement request may include verification of the application authenticity information received by the entitlement system. The application authenticity information may be verified against reference information accessible by the entitlement system. Successful verification enables the entitlement system to communicate the response to the UE. The entitlement response enables the UE to route application data corresponding to the application through a selected network slice.

According to some examples, a UE with 5G capability may support various network applications that can run on the UE. Some of the network applications may potentially be capable of using a dedicated network slice for routing application data. The UE may manage slice configuration information for the selection of a network slice for a given network application. The UE may initiate and maintain a PDU session on a network slice.

According to some examples, a UE may manage and maintain parameters for a network slice. A UE may match an application traffic flow parameters with a network slice by using a URSP rule. The URSP can be pre-configured on the UE or configured by the network dynamically. URSP is defined in Third Generation Partnership Project (3GPP) standards to describe the relationship between traffic flows and the corresponding routing.

According to some examples, a URSP may contain multiple rules for traffic flows and routing. Each rule may include a Traffic Descriptor (TD) and Route Selection Descriptor (RSD). The most common TD can be an application descriptor or an application identifier. Upon detecting an application, the UE may access the URSP rules to find matching TD such that corresponding RSD can be identified.

The RSD can be used to describe a Single Network Slice Selection Assistance Information (S-NSSAI) and other communication route characteristics that match a service flow description. A UE may use an S-NSSAI to uniquely identify a network slice. In some examples, a UE may configure a default S-NSSAI in advance. In some other examples, a network may provide a default NSSAI to a UE. Before performing a traffic flow via a network slice, a UE may request for an NSSAI to be used. The network may determine a set of network slices in which the UE is to be registered. The information may be returned to the UE. As certain network applications' service flow may utilize a dedicated network slice for efficient operation. CSP may instantiate/configure a network slice according to a service flow in URSP. When setting up a PDU session, the UE may indicate the desired S-NSSAI to select a given network slice for a particular application service flow.

Further, the method may include additional steps for a secure authentication of an application using an entitlement device. Such additional steps may be similar to various steps performed by a system, a processor executing instructions, a storage medium encoded with instructions that cause the processor to perform actions, or other means of execution, as per the examples discussed herein.

Figure 3:
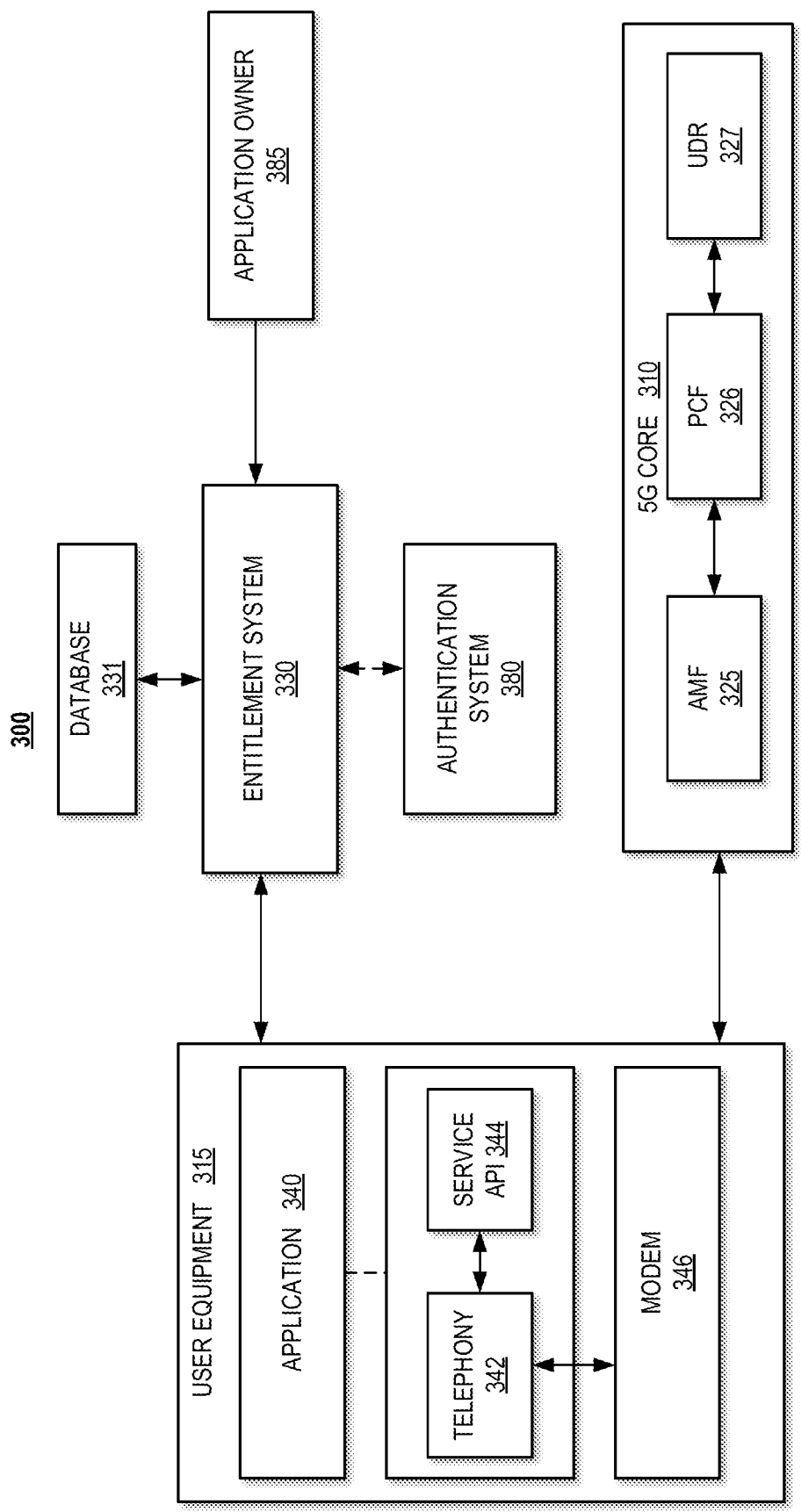
FIG. 3 illustrates a block diagram of user equipment in communication with an entitlement system and a network, in accordance with various examples of the present disclosure.

FIG. 3 is a block diagram depicting a User Equipment (UE) in a network environment 300 and its communication with an entitlement system and a network, according to various examples of the present disclosure. In some examples, entitlement system 330 may be implemented by hardware, software, or a combination of hardware and software to instantiate various network functions of a network slice. In some examples, the entitlement system may include processor-executable instructions stored on a non-transitory machine-readable storage medium (e.g., storage medium 310). In some examples, the instructions stored on the storage medium 310 may be executable by a processing resource that causes the processing resource to perform one or more operations as per the present disclosure.

According to some examples, the entitlement system 330 may receive reference authenticity information from an enterprise or owner of application 340. In some examples, the reference authenticity information may include an application signature, an application identifier, and OS-related information. The entitlement system 330 may store the reference authenticity information in a database 331. According to some examples, the entitlement system 330 may receive the reference authenticity information from an enterprise/application owner (e.g., application owner 385 corresponding to the application 340) when they subscribe to the entitlement service. The entitlement system 330 may receive such information from various application owners and the received information is securely stored in a database 331. In some examples, the database 331 can be a local storage of the entitlement system. In some other examples, the database 331 can be network-connected storage or cloud storage.

Further, a UE may perform an initial registration with the network. The network may include a core network. In a 5G communication system, the core network is referred to as a 5G Core (5GC). The 5GC may include an Access and Mobility Management Function (AMF), Policy Control Function (PCF) 326, and Unified Data Repository (UDR), among other Network Functions (NFs). For the purpose of initial registration, the UE may send a registration request to the network. The sending operation may be performed due to a power ON operation or a due reception of a signal by the UE. The registration request may be communicated to the AMF of the 5GC. For example, the UE may communicate to the AMF via a base station such as a gNB of a 5G communication system. The PCF 326 may retrieve UE related subscription information from UDR 327. Based on the subscription information, the PCF 326 may determine an appropriate policy and URSP based on one or more variables including the subscription information.

In some examples, the PCF 326 may determine a policy based on local policies and the configuration of the communication system. The PCF 326 may communicate the selected policy/URSP to the AMF 325. The AMF 325 may further communicate the URSP to the UE. The UE stores the URSP and may refer to the URSP rules for the selection of a slice for a specific application. Further, in some examples, the URSP rule received from the AMF 325 may take precedence over a pre-configured rule.

In some examples, a URSP rule may include various fields, for e.g., a length of URSP rule, a URSP rule precedence (priority), a length of TD, a TD, a length of RSD list, and an RSD/s. The RSD list may include network slice activation parameters. A network slice activation parameter can be an S-NSSAI corresponding to one or more network slices. As discussed earlier, TD may include traffic characteristics. The aforementioned and other fields of URSP rule can be similar to the definition in Technical Specification (TS) by the Third Generation Partnership Program (3GPP).

In some examples, Single Network Slice Selection Information (S-NSSAI) is used to identify a network slice in a 5G communication. The S-NSSAI may represent network resources of transport, access, and core network used for a network slice. As per the Third Generation of Partnership Program (3GPP), S-NSSAI may be used to describe, maintain and/or manage network slices. A user/UE may be subscribed to S-NSSAIs, and such information may be available with the CSP.

A URSP may contain multiple rules for traffic flows and routing. Each rule consists of two components, viz., a Traffic Descriptor (TD) and a Route Selection Descriptor (RSD). TD and RSD may be used to describe an S-NSSAI and other route characteristics that match a service flow description. To identify a traffic flow and associated slice, TD may be used. TD can be a Data Network Name (DNN), an Internet Protocol (IP) address, a port number, a protocol identifier (ID), a destination Fully Qualified Domain Name (FQDN), an Operating System identifier (OSId), and an Operating System Application identifier (OSAppID).

In some examples, multiple network slices may be available with multiple profiles to provide different levels of experience, security, and/or privacy requirements. The entitlement system may receive an application entitlement request from a UE. The application entitlement request may be in response to an application being launched on the UE. The application may invoke a service Application Programming Interface (API) 344 to initiate the application entitlement request.

In some examples, the communication between the UE and the entitlement system may be a Hyper Text Transfer Protocol (HTTP) based communication. Prior to the management of the entitlement request (e.g., validation of application), the entitlement system may initiate an authentication process. In some examples, the authentication process can be an Extensible Authentication Protocol method for Authentication and Key Agreement (EAP-AKA), EAP-AKA Prime, or other similar authentication processes. For example, the EAP-AKA mechanism for authentication may use Universal Mobile Telecommunication System (UMTS) for authentication. In some examples, the authentication process is integral to the entitlement system.

As per examples of FIG. 3, a separate authentication system 380 may be provided. The authentication system 380 may be communicatively coupled with the entitlement system. In some examples, the entitlement system may relay the authentication process to the authentication system. The authentication system 380 may include Authentication, Authorization, and Accounting (AAA), Business Support System (BSS), and so forth.

In some examples, the aforementioned service API 344 includes but is not limited to a Technical Specification (TS).43 Service API. As discussed earlier, the application on the UE invokes the service API 344 for the application entitlement request. Further, on initiation of the EAP-AKA challenge, the service API 344 may invoke a telephony API 342 to take up the authentication challenge and related response. As used herein, a telephony API is an interface that contains data related to phone operation, SMS, and/or MMS messages.

Based on the condition that the authentication process is successful, the entitlement system may further validate whether the application in the URSP rule and the application on the UE is legitimate. For the purpose of validation, the entitlement system may compare the application authenticity information with reference authenticity information. In some examples, the UE may send at least one of an application signature generated by the application owner, identification information of the application owner, application identifier, Operating System (OS) information, and/or hardware information of the UE as part of the application authenticity information.

In some examples, the communications between the service API 344 and the entitlement system are secured. In some examples, a Transport Level Security (TLS) encryption protocol may be used to protect communication between the UE 315 and the entitlement system 330. The entitlement system may send an entitlement response based on the condition that the entitlement process is successful.

In some examples, the service API 344 receives the entitlement response from the entitlement system 330. The telephony component (e.g., the telephony API/telephony 342) checks the results received at the service API. Based on a determination that the entitlement response is successful, the telephony component may communicate with a modem 346 for URSP rule mapping. As used herein, URSP rule mapping may include selecting a URSP rule, which informs on which PDU session of a network slice data of a given application can be transmitted. Further, when a network application intends to communicate, the UE may initiate a PDU session setup procedure. Based on the URSP, the UE can indicate an S-NSSAI during the PDU session setup procedure such that an appropriate network slice is made available.

In some examples, the entitlement system 330 may receive an entitlement request from the UE, upon detection of an application. The entitlement system 330 may send an entitlement response (e.g., a valid application or invalid application) to the UE 315. The UE 315 may store the entitlement response, for use when the application wants to communicate application data. When the application is launched on the UE 315, the UE 315 may refer to the validation response to either use a target network slice or a default network slice. For example, based on the condition that the application validation is successful, the UE 315 may refer to the URSP rule for the service flow of application data. Whereas, based on the condition that the application validation has failed, the UE 315 may continue to use a default network/network slice.

In one example, network functions and/or the entitlement system 330 can be cloud-native with cloud capabilities. In another example, entitlement system 330 can be a containerized application, built as stateless microservices deployed on a container orchestration platform (e.g., Kubernetes, Docker Swarm, or the like).

In the examples described herein, a processing resource, e.g., the processor 155 of FIG. 1, may include, for example, one or more processors included in a single computing device or distributed across multiple computing devices. As used herein, a "processor" may be at least one of a central processing unit (CPU), a semiconductor-based microprocessor, a graphics processing unit (GPU), or a field-programmable gate array (FPGA) configured to retrieve and execute instructions. In further examples, other electronic circuitry suitable for the retrieval and execution of instructions stored on a computer-readable storage medium may be used.

Figure 4:
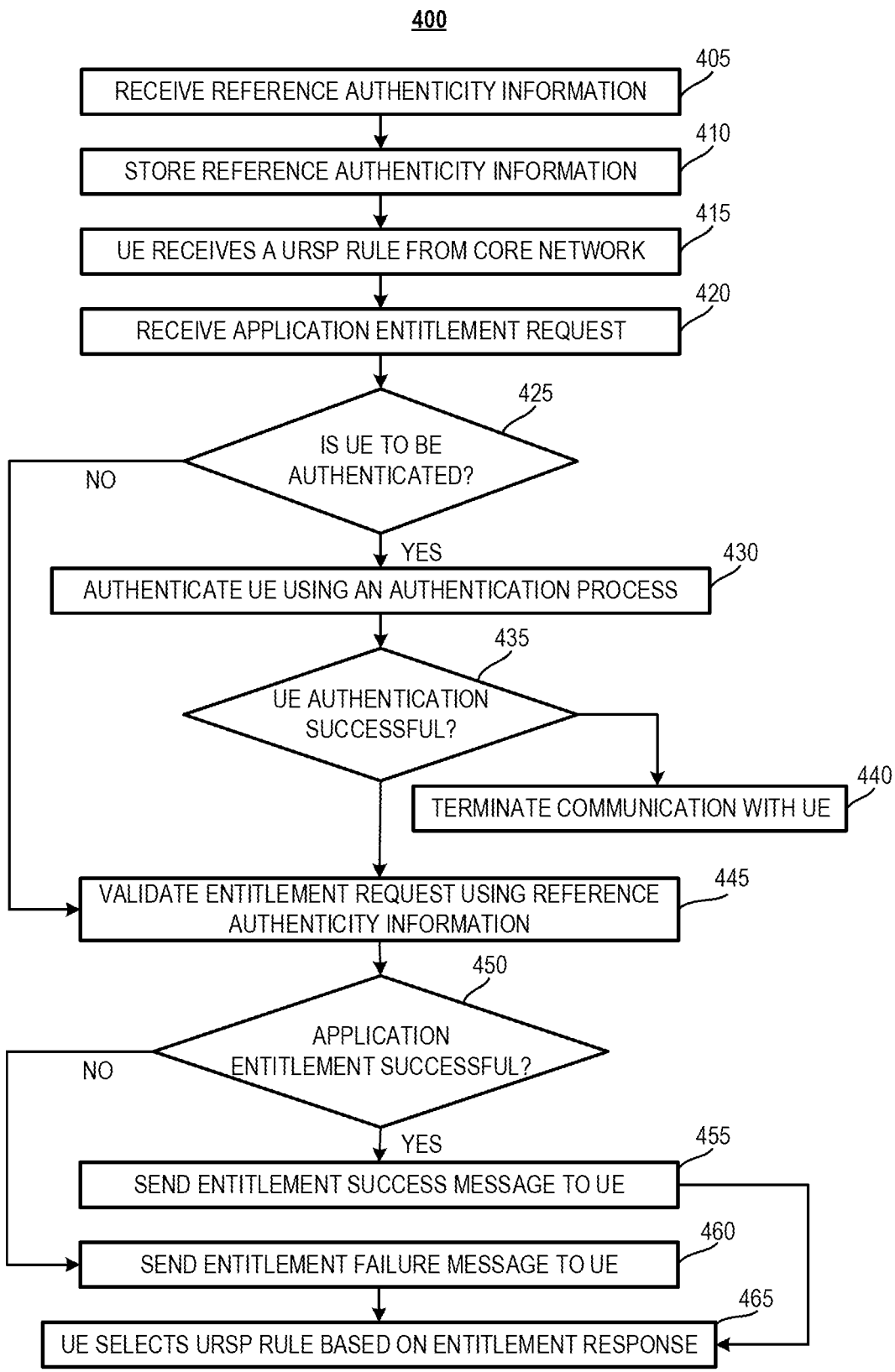
FIG. 4 illustrates a flow diagram for authenticating and configuring User Equipment (UE) for network slice selection, in accordance with various examples of the present disclosure.

FIG. 4 illustrates a flow diagram 400 for authenticating and configuring User Equipment (UE) for network slice selection, in accordance with various examples of the present disclosure. Blocks of the flow diagram may be executable by a single system, such as the entitlement system 330 of FIG. 3, or may spread among multiple systems/devices. In one example, the flow diagram 400 may be implemented in the form of executable instructions stored on a machine-readable storage medium and/or in the form of electronic circuitry, e.g., hardware. One or more blocks of the flow diagram 400 may be executed substantially concurrently, in a different order than shown in FIG. 4, per some examples. In some other examples, one or more blocks may be skipped, and at certain times, can be ongoing and/or may repeat. In some examples, the blocks of the flow diagram 400 may be stored as instructions in a storage medium of a system (e.g., the entitlement system 330 of FIG. 3). Such instructions are executable by a processing resource (e.g., the processor 155 of FIG. 1) that cause the processing resource to perform one or more steps discussed herein.

At block 405, the entitlement system may receive reference authenticity information from an enterprise, such as an application owner. The reference authenticity information may be associated with an application. At block 410, the entitlement system may store the reference authenticity information, e.g., securely in a database.

When a UE is powered ON or receives a network signal during an initial setup, in an example, at block 415, the UE may receive a URSP rule from a communication system. In some other examples, a UE may be preconfigured with URSP rules, such that no additional communication from the communication system may be occurring. In some examples, the core network communicates the URSP rule that includes a network slice identifier for a network slice instance to the UE. The UE may store the URSP rule in a non-volatile memory of the UE.

At block 420, the entitlement device may receive an application entitlement request from the UE. The entitlement request may include application authenticity information that may be used for validation of the entitlement request. In some examples, the application authenticity information may include an application signature. The application signature may reliably identify the author of an application.

At block 425, the entitlement device may check whether the UE is to be authenticated before performing the entitlement process. In some examples, for security reasons, a UE may undergo an authentication process prior to the validation of an entitlement request.

At block 430, based on the condition that the UE is to be authenticated (YES condition at block 425), the entitlement device may relay authentication communication between the UE and an authentication system of a network operator. In some examples, the authentication system may be remotely located from the entitlement device. For example, the authentication system can be located at CSP premises, which can be at a base station, at Edge, or a data center.

In some examples, the authentication process may include a secure/encrypted protocol such as EAP-AKA, EAP-AKA Prime (AKA'), EAP-Transport Layer Security (TLS), EAP-Tunneled Transport Layer Security (TTLS), or similar protocols. The authentication protocol can be used for authentication and key agreement. In some examples, for the purpose of authentication of the UE, an authorization server, such as a subscriber profile server, an authentication server, or a home subscription server may be used.

At block 435, the entitlement device may determine whether the authentication process is successful or not. At block 440, based on the condition that the authentication process has failed/been unsuccessful (NO condition at block 435), the entitlement device may terminate further communication with the UE. In such conditions, the UE may use a default network slice pre-configured on the UE or communicate by core network (e.g., 5GC).

At block 445, based on the condition that the authentication of the UE is successful, the UE may proceed to validate the entitlement request. According to some examples, validation of entitlement requests is based on the reference authenticity information stored in the database. The application authenticity information received by the entitlement device may include an application signature and an application identifier, per some examples. The entitlement device may retrieve reference authenticity information from the database using the application identifier. The entitlement device may use the application signature from the reference authenticity information to validate the received application signature. The validation of the application indicates that the application is authentic as per its claim and is authorized to use a specific network slice.

Based on the condition that the application entitlement is successful (YES condition at block 450), at block 455, the entitlement device may send an entitlement response to the UE. The entitlement message can be a success message to the UE.

Whereas, at block 460, based on the condition the application entitlement has failed (NO condition at block 450), the entitlement device may send an entitlement response. The entitlement response may indicate that the application entitlement has failed.

At block 465, based on the entitlement response (e.g., entitlement message), the UE may select an appropriate URSP rule. Based on the URSP rule, the UE can perform a selection between multiple network slices. Selection between multiple network slices enables various applications and services with specific requirements to communicate over various network slices without switching devices. Further, a single UE can provide multiple levels of experience based on application operating parameters with secure application authentication. The secure application authentication/validation process reduces/eliminates the usage of work profiles and resources utilized for maintaining work profiles.

In some examples, based on failed entitlement process, the UE may select a default network slice to establish a PDU session for the transmission/routing of application data. The modem may initiate the PDU session based on a default slice identifier associated with a default network slice.

In some examples, on condition that the entitlement process is successful, the modem may determine that a USRP rule corresponding to the application identifier is available in the UE memory. The UE initiates a PDU session by transmitting a request to establish a PDU session for the application based on the slice identifier included in the USRP rule.

Figure 5:
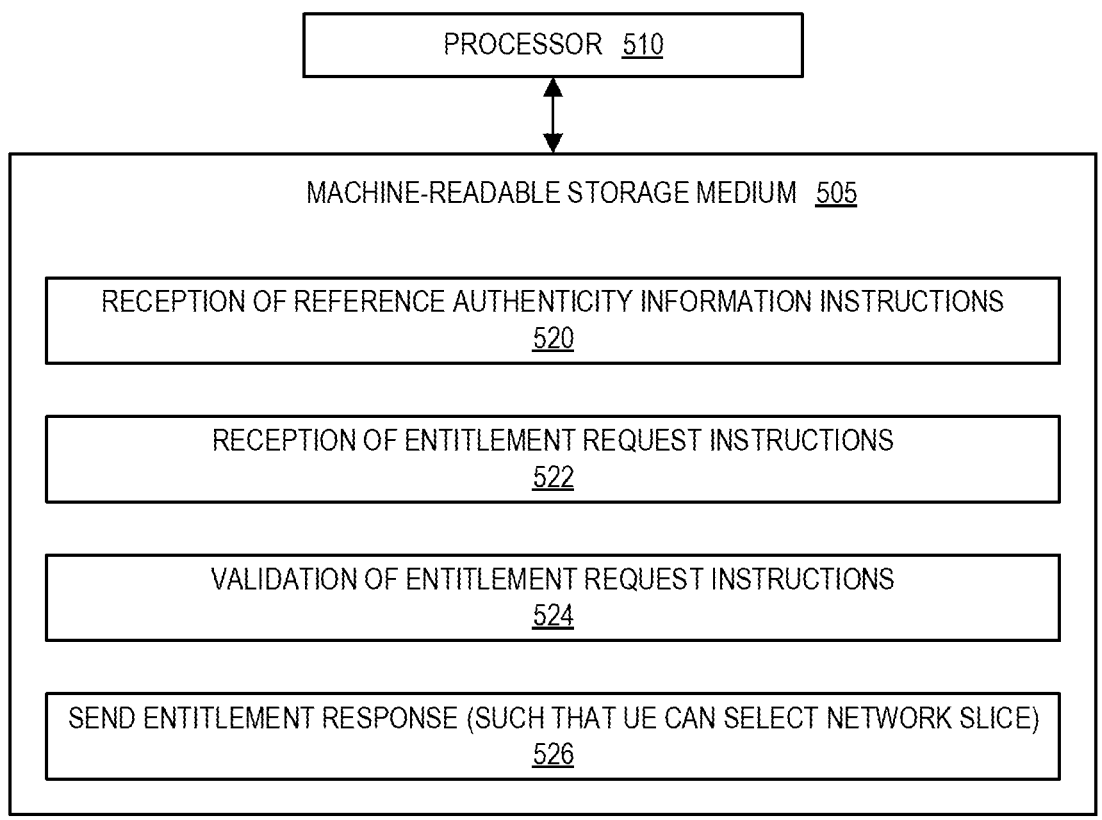
FIG. 5 illustrates a block diagram of a storage medium storing instructions that are executable by a processor, according to various examples of the present disclosure.

FIG. 5 illustrates a block diagram of a non-transitory storage medium storing instructions, as per examples of the present disclosure. The instructions may be executable by a processor that causes the processor, to securely authenticate an application for communicating application data over a selected network slice. Furthermore, it should be appreciated that although the various instructions are illustrated as being co-located with a processor, one or more instructions may be executed remotely from the other instructions.

The instructions stored in the storage medium 505 may be executable by one or more processors. As per the ongoing example, a processor 510 is depicted. The instructions may be read into a main memory from another storage medium, which is a non-transitory type. The term "non-transitory," and similar terms, may refer to any media that store data and/or instructions that cause a machine to operate in a specific fashion.

The storage medium 505 may store instructions, executable by the processor 510, to perform one or more actions as per the present disclosure. According to some examples, the reception of reference authenticity information instructions 520, may cause the processor, to receive reference authenticity information corresponding to an application from an application owner. Instructions 520 may include further instructions to store the reference authenticity information that is received in a database.

The reception of entitlement request instructions 522, may cause the processor, to receive an application entitlement request corresponding to an application, which is on a UE (e.g., the UE 115). The application entitlement request may include application authenticity information, such as an application signature and application identifier. The application signature can be generated by an application developer/owner and can be unique to each application. The application identifier can be used to uniquely identify each application. In some examples, the UE may communicate with the entitlement system using an HTTP/S protocol.

Further, the processor 510 may execute validation instructions 524, which causes the processor, to validate the authenticity of the application based on the application authenticity information. The entitlement system may authorize any legitimate application entitlement request and is configured to identify any unauthorized/rogue applications. In some examples, for the purpose of validation, the application signature may be verified against a reference application signature available with the entitlement system.

The send entitlement response instructions 526 may cause the processor to send an entitlement response to the UE in response to the validation of the application entitlement request. According to some examples, validation of the application entitlement request may include verification of the application authenticity information received by the entitlement system. The outcome of the application entitlement request can be a success or a failure. A valid application authenticity information may result in a successful entitlement validation. Accordingly, the processor may execute instructions that cause the processor to send an entitlement response (e.g., entitlement success message) to the UE. The UE may match an application service flow with a target network slice based on a URSP that the UE may have received from the core network. In some examples, during an initial registration of the UE, the CSP may communicate URSP and/or an NSSAI to the UE.

In some examples, upon successful validation of the entitlement request, the UE may send a session request to establish the application session. The CSP may instantiate a network slice instance using resources of the network. The network slice instance may be associated with a Data Network Name (DNN) and an S-NSSAI, which are included in the session request.

In general, the memory devices described herein may be formed from non-transitory memory devices, such as semiconductor storage devices, flash memory devices, memristors, phase change memory devices a combination of one or more of the foregoing storage technologies, and so forth. Moreover, the memory devices may be volatile (e.g., dynamic random-access memory (DRAM) devices, static random access (SRAM) devices, and so forth) or non-volatile memory devices (e.g., flash memory devices, read-only memory (ROM) devices and so forth), unless otherwise stated herein.

Wherever possible, the same reference numbers may be used in the drawings and the following description to refer to the same or similar parts. While several examples are described in the description, modifications, adaptations, and other examples are possible. Accordingly, the detailed description does not limit the disclosed examples. Instead, the proper scope of the disclosed examples may be defined by the appended claims.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method. The method also includes receiving, by an entitlement system, an application entitlement request corresponding to an application that is on the user equipment, where the application entitlement request includes application authenticity information. The method also includes validating, by the entitlement system, the authenticity of the application based on the application authenticity information. The method also includes in response to validation of the application entitlement request, sending, by the entitlement system, an application entitlement response to the user equipment such that the user equipment routes application data corresponding to the application through a selected network slice. Other embodiments of this aspect include corresponding computer systems, apparatus, and computer programs recorded on one or more computer storage devices, each configured to perform the actions of the methods.

One general aspect includes a system. The system also includes a processor. The system also includes a storage medium operatively connected to the processor and storing instructions that when executed, causes the processor to: receive reference authenticity information corresponding to an application from an application owner; store the reference authenticity information that is received in a database; receive an application entitlement request corresponding to the application from user equipment, where the application entitlement request includes application authenticity information; validate the authenticity of the application by comparing the application authenticity information with the reference authenticity information stored in the database; and in response to validation of the application entitlement request, send an application entitlement response to the user equipment such that the user equipment selects a selected network slice to route application data corresponding to the application. Other embodiments of this aspect include corresponding computer systems, apparatus, and computer programs recorded on one or more computer storage devices, each configured to perform the actions of the methods.

One general aspect includes a non-transitory storage medium for storing instructions. The non-transitory storage medium storing instructions also include receiving reference authenticity information corresponding to an application from an application owner. The instructions also include storing the reference authenticity information that is received in a database. The instructions also include receiving an application entitlement request corresponding to the application that is on the user equipment, where the application entitlement request includes application authenticity information. The instructions also include validating the application entitlement request by comparing the application authenticity information with the reference authenticity information stored in the database. The instructions also include in response to validation of the application entitlement request, sending an application entitlement response to the user equipment such that the user equipment selects a selected network slice to route application data corresponding to the application. Other embodiments of this aspect include corresponding computer systems, apparatus, and computer programs recorded on one or more computer storage devices, each configured to perform the actions of the methods.

In general, the words "component," "system," and the like, as used herein, can refer to logic embodied in hardware or firmware, or to a collection of instructions, possibly having entry and exit points, written in a programming language. It will be appreciated that software components may be callable from other components or from themselves, and/or may be invoked in response to detected events or interrupts. Software code may be stored, partially or fully, on a memory device of the executing computing device, for execution by the computing device. Software instructions may be embedded in firmware, such as an Erasable Programmable Read-Only Memory (EPROM). It will be further appreciated that hardware components may be comprised of connected logic units, such as gates and flip-flops, and/or may be comprised of programmable units, such as programmable gate arrays or processors.

As used herein, the term "or" may be construed in either an inclusive or exclusive sense. Moreover, the description of resources, operations, or structures in the singular shall not be read to exclude the plural. Conditional language, such as, among others, "can," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open-ended as opposed to limiting. Adjectives such as "traditional," "known," and terms of similar meaning should not be construed as limiting the item described to a given period or to an item available as of a given time, but instead should be read to encompass conventional, normal, or standard technologies. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
receiving, by an entitlement system, an application entitlement request corresponding to an application that is on a user equipment, wherein the application entitlement request includes application authenticity information;
validating, by the entitlement system, authenticity of the application based on the application authenticity information; and
in response to validation of the application entitlement request, sending, by the entitlement system, an application entitlement response to the user equipment, wherein the application entitlement response includes application validity information that enables the user equipment to route application data corresponding to the application through a selected network slice.

2. The method of claim 1, wherein the selected network slice is a target network slice of a communication system responsive to a successful validation of the application entitlement request.

3. The method of claim 1, wherein the selected network slice is a default network slice of a communication system based on a condition that the validation of the application entitlement request is unsuccessful.

4. The method of claim 1, wherein validating the authenticity of the application includes:
comparing the application authenticity information with reference authenticity information stored in a database that is accessible by the entitlement system.

5. The method of claim 4, further comprising:
receiving, by the entitlement system, an authentication request along with the application entitlement request; and
validating, by the entitlement system, the authentication request prior to validation of the application entitlement request.

6. The method of claim 5, wherein the authentication request is at least one of an Extensible Authentication Protocol (EAP)-Authentication and Key Agreement (AKA), an Extensible Authentication Protocol (EAP)-Authentication and Key Agreement Prime (AKA') and other authentication protocol.

7. The method of claim 1, further comprising:
receiving, by the entitlement system, reference authenticity information corresponding to the application from an application owner; and
storing, by the entitlement system, the reference authenticity information that is received in the database.

8. The method of claim 1, wherein receiving the application entitlement request is performed in response to at least one of detection of the application and launching of the application on the user equipment and the application triggering a service Application Programming Interface (API) to initiate the application entitlement request.

9. The method of claim 1, wherein the user equipment includes a User Equipment Route Selection Policy (URSP) rule that includes one or more Traffic Descriptors (TDs) and a Route Selection Descriptors (RSDs); and based on the application validity information, the user equipment refers to one or more TDs to select an RSD to route the application data.

10. A system, comprising:
a processor; and
a storage medium operatively connected to the processor and storing instructions that when executed, causes the processor to:
receive reference authenticity information corresponding to an application from an application owner;
store the reference authenticity information that is received in a database;

receive an application entitlement request corresponding to the application from a user equipment (UE), wherein the application entitlement request includes application authenticity information;

validate authenticity of the application by comparing the application authenticity information with the reference authenticity information stored in the database; and in response to validation of the application entitlement request, send an application entitlement response to the user equipment, wherein the application entitlement response includes application validity information, and based on the application entitlement response, the UE refers to a User Equipment Router Selection Policy (URSP) rule available on the UE to select a network slice to route application data corresponding to the application.

11. The system of claim 10, wherein the instructions that cause the processor to send the application entitlement response, further includes instructions that cause the processor to:

send the application entitlement response to the user equipment such that the user equipment routes data through a default network slice due to failed validation of the application entitlement request.

12. The system of claim 10, wherein the reference authenticity information includes at least one of an application signature, an application identifier, and an Operating System (OS) information.

13. The system of claim 10, wherein the database is at least one of a local storage of the system, a network-connected storage, and remotely disposed storage.

14. The system of claim 10, wherein the system is communicatively coupled to a Mobile Network Operator (MNO) network for authentication of the user equipment prior to validation of the application entitlement request.

15. The system of claim 10, wherein the URSP rule is provided to the user equipment by at least one of a pre-configuration or communication from a core network of a Communication Service Provider (CSP).

16. The system of claim 10, wherein the application entitlement request and the application entitlement response are communicated via an encrypted communication protocol.

17. A non-transitory storage medium storing instructions, the instructions executable by a processor, to:

receive reference authenticity information corresponding to an application from an application owner;

store the reference authenticity information that is received in a database;

receive an application entitlement request corresponding to the application that is on a user equipment, wherein the application entitlement request includes application authenticity information;

validate the application entitlement request by comparing the application authenticity information with the reference authenticity information stored in the database; and in response to validation of the application entitlement request, send an application entitlement response to the user equipment, wherein the application entitlement response includes application validity information such that the user equipment selects a network slice to route application data corresponding to the application.

18. The non-transitory storage medium of claim 17, wherein the network slice selected by the user equipment is a target network slice of a communication system based on a condition that the validation of the application entitlement request is successful, and the target network slice is optimized according to the application.

19. The non-transitory storage medium of claim 17, wherein the application authenticity information includes at least one of an application signature generated by the application owner, identification information of the application owner, application identifier, an Operating System (OS) information, and a hardware information of the user equipment.

20. The non-transitory storage medium of claim 17, wherein the instructions to receive the application entitlement request is executed in response to the application being launched on the user equipment.

* * * * *